(No Model.) 4 Sheets—Sheet 1.
J. G. STAMP.
VELOCIPEDE.
No. 496,800. Patented May 2, 1893.
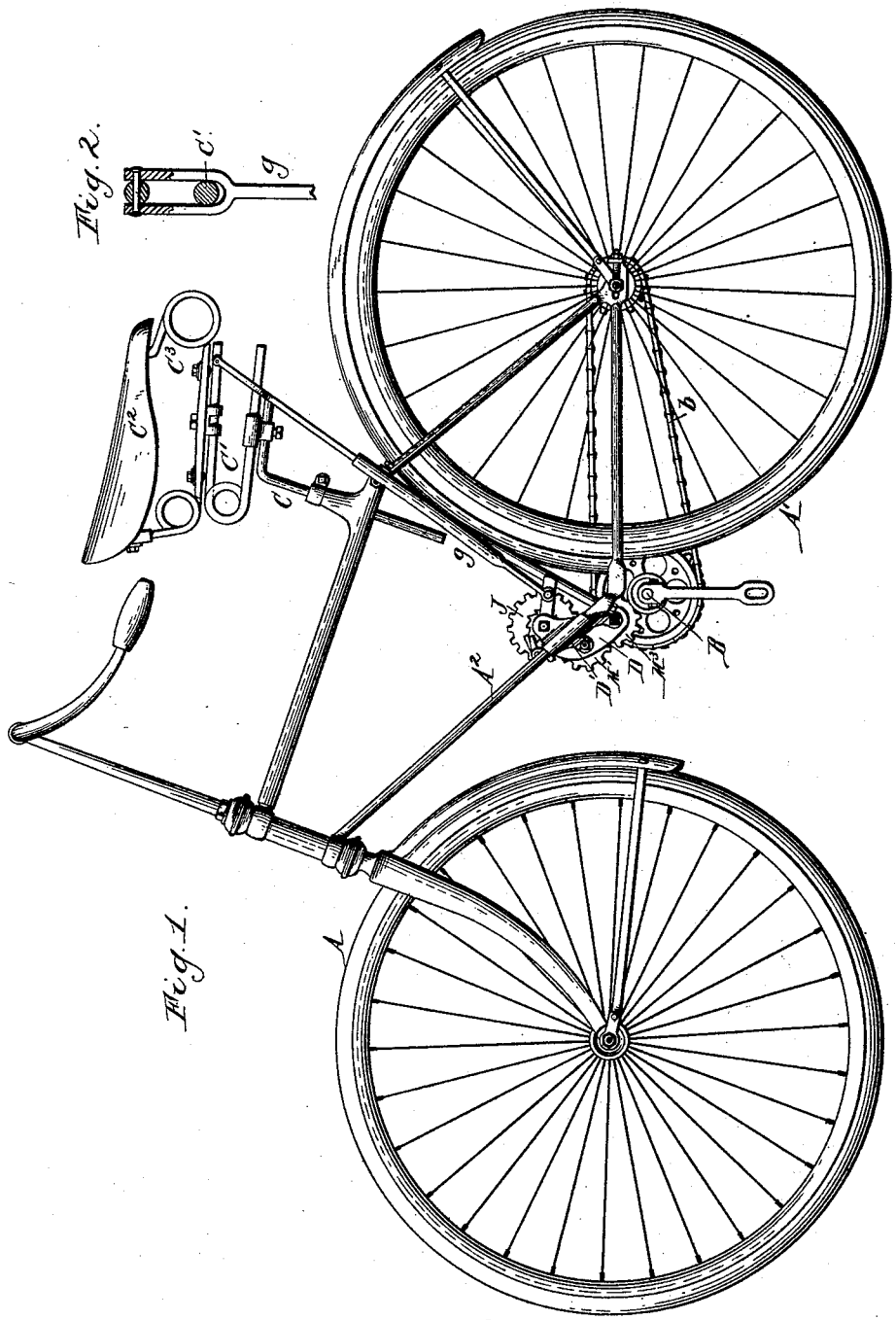
Witnesses:
Emil Neuhart
Theo. L. Popp
John G. Stamp Inventor.
By Wilhelm Bonnet
Attorneys.

(No Model.) 4 Sheets—Sheet 2.
J. G. STAMP.
VELOCIPEDE.
No. 496,800. Patented May 2, 1893.
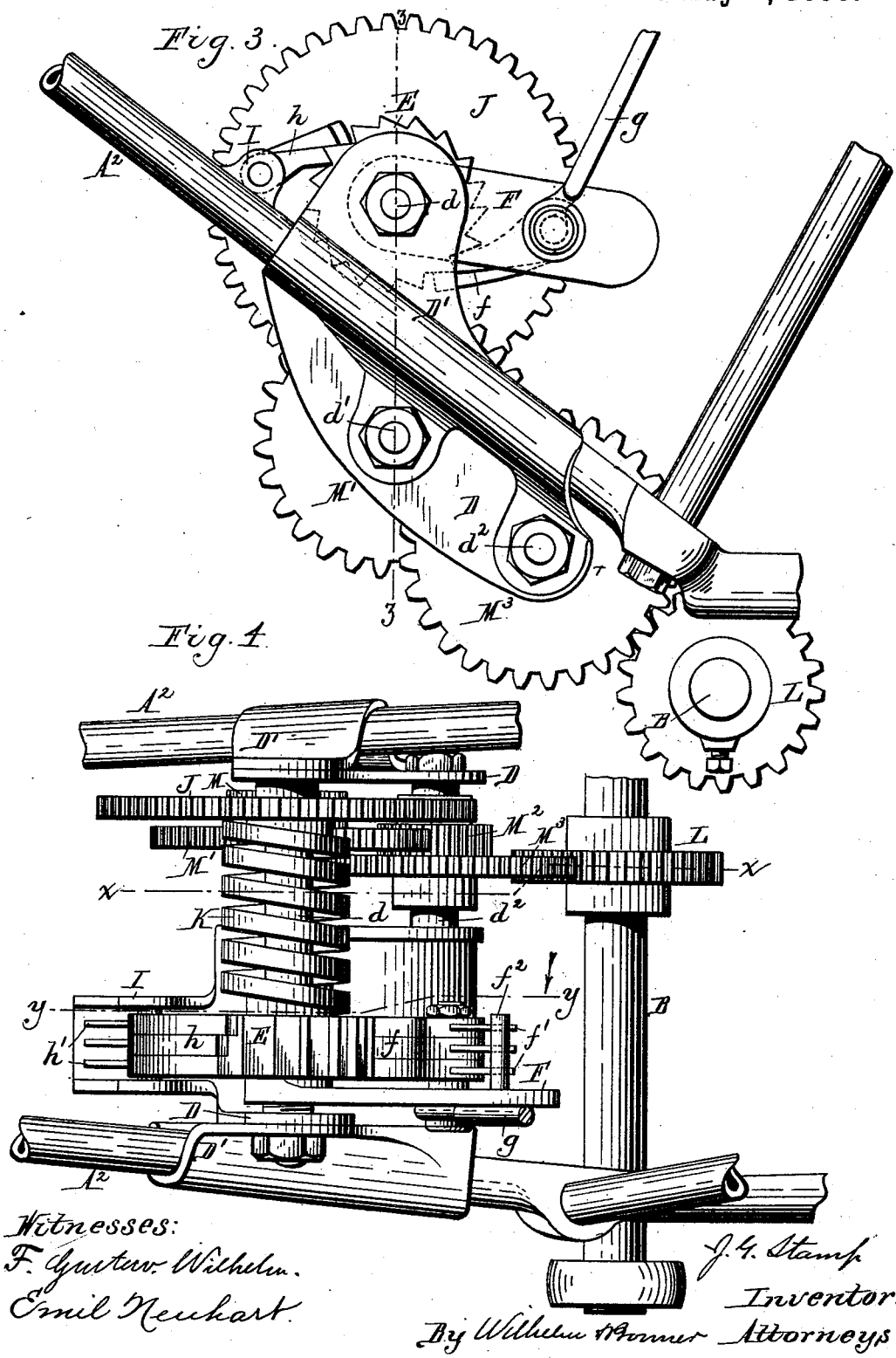
Witnesses:
F. Gustav Wilhelm.
Emil Neuhart.
J. G. Stamp,
Inventor.
By Wilhelm & Bonner Attorneys.

(No Model.) 4 Sheets—Sheet 3.

J. G. STAMP.
VELOCIPEDE.

No. 496,800. Patented May 2, 1893.

Witnesses:
Emil Neuhart
Theo. L. Popp

John G. Stamp Inventor.
By Wilhelm Bonner
Attorneys.

THE NORRIS PETERS CO., PHOTO-LITHO., WASHINGTON, D. C.

(No Model.) 4 Sheets—Sheet 4.

J. G. STAMP.
VELOCIPEDE.

No. 496,800. Patented May 2, 1893.

Witnesses:
Chas. F. Burkhardt.
Emil Neuhart.

John G. Stamp, Inventor.
By Wilhelm Bonner
Attorneys.

UNITED STATES PATENT OFFICE.

JOHN G. STAMP, OF BUFFALO, NEW YORK, ASSIGNOR OF TWO-THIRDS TO CHARLES J. J. SEAMAN AND HARRY TOWNSEND DAVIS, OF SAME PLACE.

VELOCIPEDE.

SPECIFICATION forming part of Letters Patent No. 496,800, dated May 2, 1893.

Application filed June 10, 1892. Serial No. 436,245. (No model.)

*To all whom it may concern:*

Be it known that I, JOHN G. STAMP, a citizen of the United States, residing in the city of Buffalo, in the county of Erie and State of New York, have invented a new and useful Improvement in Velocipedes, of which the following is a specification.

The object of my invention is to utilize the power of vehicle vibrations for aiding the progress of the vehicle, and more particularly the power of the seat vibrations of velocipedes, for assisting in driving the same, so as to relieve the rider, especially in riding over rough roads or in ascending heavy grades.

Figure 5:
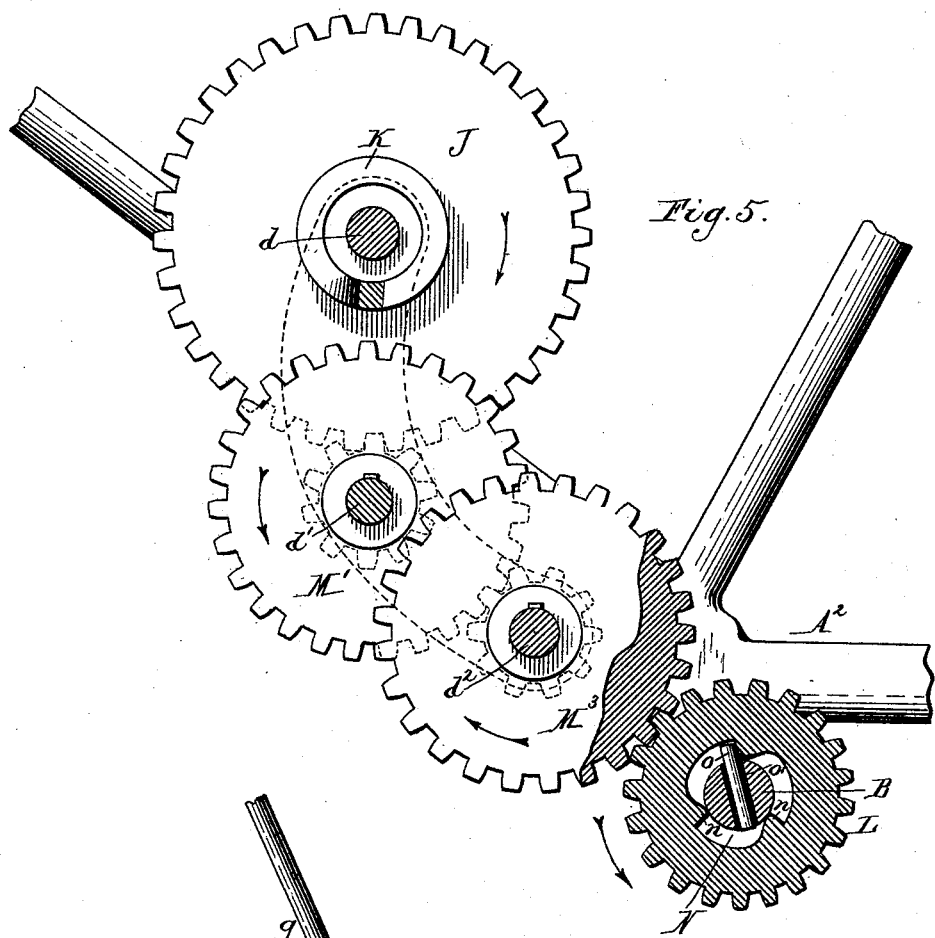
Figure 6:
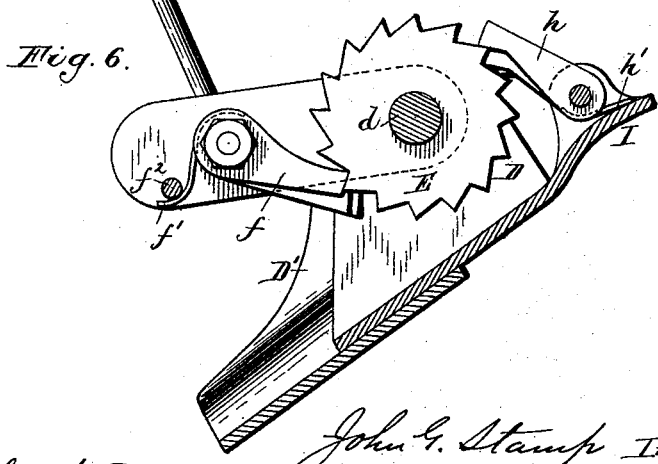
Figure 7:
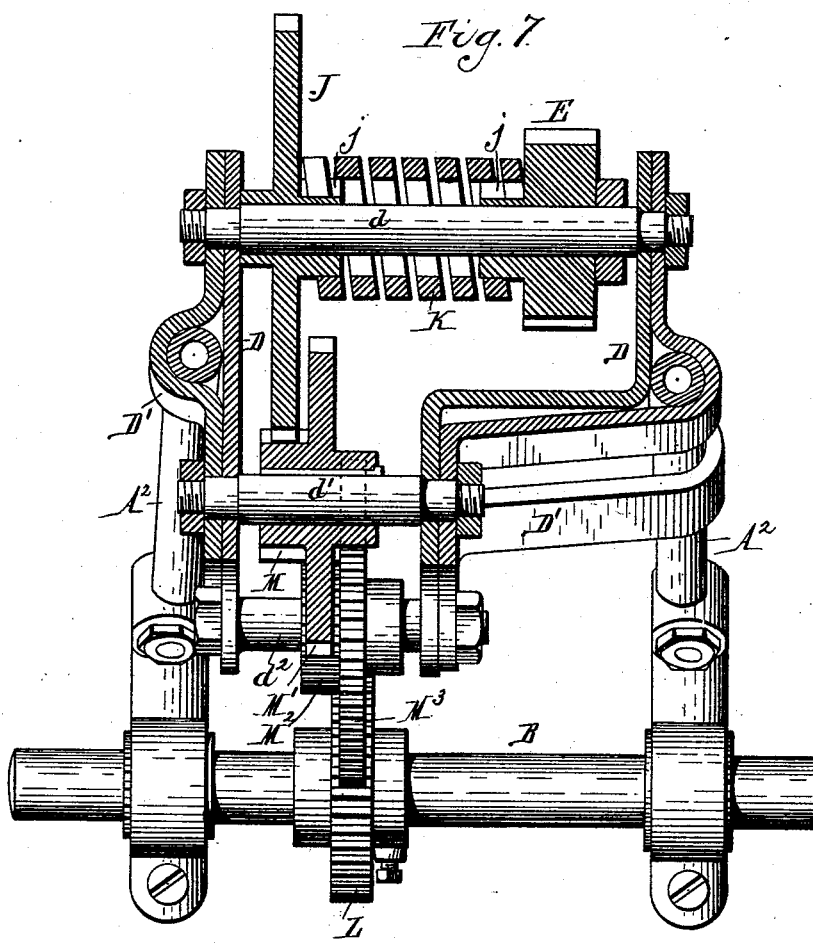

In the accompanying drawings consisting of four sheets:—Figure 1 is a side elevation of a velocipede provided with my improved motor. Fig. 2 is a sectional elevation, on an enlarged scale, of the upper portion of the rod which connects the seat-spring with the arm which carries the actuating pawl of the ratchet wheel. Fig. 3 is an enlarged side elevation of the motor and the adjacent parts of the frame. Fig. 4 is a top plan view thereof. Fig. 5 is a vertical longitudinal section of the motor in line $x—x$, Fig 4. Fig. 6 is a similar view thereof, in line $y—y$, Fig. 4, looking in the direction of the arrow. Fig. 7 is a vertical cross section of the motor in line $z—z$, Fig. 3, looking toward the right.

Like letters of reference refer to like parts in the several figures.

A represents the steering wheel of the velocipede, A' the driving wheel, and $A^2$ the main connecting frame.

B is the crank shaft which is geared with the rear wheel in the usual manner by the sprocket chain $b$ running around sprocket wheels secured respectively to the crank shaft and the axle of the rear wheel.

C is the vertically adjustable saddle pillar supported upon the main frame, C' the spring secured to the arm of the saddle pillar, and $C^2$ the seat or saddle having the usual spring $C^3$ which is in turn supported upon the spring C' secured to the saddle pillar.

As shown most clearly in Figs. 1, 3, 4 and 7, the parts of the motor are supported upon a frame composed of side plates D secured to the lower members of the main frame by clamping plates or straps D' which embrace the outer sides of said members, said side plates and clamping plates being firmly tied together by transverse bolts or spindles $d\ d'\ d^2$ which pass with their end portions through openings in the plates.

E is a ratchet wheel mounted loosely upon the uppermost spindle $d$ near one end thereof, and $f$, represents one or more actuating pawls engaging against the rear side of the ratchet wheel and pivoted to a vibrating arm F which is loosely hung at its inner end upon the spindle $d$. The actuating pawls $f$ are held in engagement with the teeth of the ratchet wheel by springs $f'$ secured to the hubs of the pawls and bearing against a horizontal pin $f^2$ secured to the vibrating arm F.

$g$ is a rod connecting the free end of the vibrating arm F with the upper branch of the intermediate saddle-spring C', and whereby the vibrations of said spring, due to the motion of the saddle, are imparted to the vibrating arm and the actuating pawls, thereby causing the pawls to turn the ratchet wheel forward a certain distance at every downward stroke of the saddle. The connecting rod $g$ is preferably composed of telescopic sections which are lengthwise adjustable upon each other, so that the length of the rod can be adjusted in accordance with the height of the seat. The upper end of the connecting rod is forked, as shown in Fig. 2, and embraces the lower branch of the spring C', thus permitting the necessary play of the rod without striking said branch.

$h$ represents one or more detents engaging against the front side of the ratchet wheel E and which prevent retrograde movement of the ratchet wheel. These detents are pivoted to an inward and forward extension I formed on one of the side plates D, and are provided with springs $h'$ whereby they are held in engagement with the ratchet wheel.

In order to permit the employment of a ratchet wheel having coarse and strong teeth, and at the same time cause vibrations of the saddle to be transmitted to the ratchet wheel, which are too short to turn the wheel the distance of a tooth, several actuating pawls of different lengths are employed. In the drawings, three such pawls are shown, so that if the vibrations of the saddle are insufficient to cause the wheel to turn the distance of a tooth, one or another of the pawls will be in the proper position to engage against the abrupt face of a tooth of the wheel and thereby turn the wheel the distance of a third or two-thirds of a tooth. The detents correspond in number with the actuating pawls and are of correspondingly different lengths so as to arrest the ratchet wheel after each stroke of an actuating pawl, without permitting lost motion.

J is a large spur wheel mounted loosely upon the uppermost spindle $d$ near one end thereof, and K is a spiral spring surrounding the spindle and secured at one end to the hub of the ratchet wheel E and at its opposite end to the hub of the spur wheel G, so as to be strained or wound up at one end by the rotation of the ratchet wheel, and to transmit a rotary motion to the spur wheel J by its tendency to unwind at its oppsite end. The hubs of the ratchet wheel and the spur wheel J are provided with grooves or recesses $j$ in which the ends of the spiral spring are seated, as shown in Fig. 7. This construction permits the spring to be readily detached from the ratchet and spur wheels for repairing or renewing it, upon removing the spindle $d$ from the stationary frame of the motor.

L is a gear wheel mounted upon the crank shaft, and M M' $M^2$ $M^3$ represent a train of gear wheels and pinions whereby the rotary motion of the large spur wheel J is transmitted to the gear wheel of the crank shaft at a multiplied rate of speed. The gear wheel M' is mounted upon the rotary spindle $d'$ and formed with the pinion M which meshes with the spur wheel J. The large gear wheel $M^3$ is mounted upon the rotary spindle $d^2$ and formed with the pinion $M^2$ which meshes with the large spur wheel M'. The gear wheel $M^3$ meshes in turn with the gear wheel L on the crank shaft, thus completing the train from the latter to the spur wheel J. The gear wheel L is arranged loosely on the crank shaft and is connected with the latter by a clutch or ratchet device which causes the motion of the gear wheel to be transmitted to the crank shaft when the latter rotates forwardly slower than said gear wheel tends to turn, but allows the crank shaft to turn forwardly without affecting said gear wheel and the connecting gearing when the crank shaft rotates at a higher rate of speed than said gear wheel. This clutch device preferably consists of a number of teeth $n$ arranged equidistant within a chamber or cavity N formed in the gear wheel L around the crank shaft, and a stop pin $o$ which reciprocates in a transverse opening $o'$ in the crank shaft, as shown in Fig. 5. The teeth $n$ are provided with abrupt faces and inclined backs, and the stop-pin is of such length that when one end thereof is retracted into the opening of the crank shaft its other end projects into the path of the clutch teeth. When the gear wheel of the crank shaft tends to rotate at a higher rate of speed than the crank shaft, the abrupt face of one of the clutch teeth $n$ strikes against the projecting end of the stop-pin $o$ and causes the crank shaft to turn forward with the gear wheel, while when the speed of the shaft exceeds that of the gear wheel, the ends of the stop-pin alternately ride over the inclined backs of the teeth, thus allowing the crank shaft to turn forwardly without affecting the gear wheel L and the parts geared therewith. Any other suitable ratchet or clutch device may be employed for this purpose, if desired.

In riding the velocipede, the saddle is caused to vibrate more or less owing to the pressure of the rider's feet on the pedals and the jarring of the machine, due to the unevenness of the road, and these vibrations are transmitted by the connecting rod $g$ and oscillating arm F to the actuating pawls, which latter are caused to intermittently turn the ratchet wheel E forward a greater or less distance according to the length of the vibrations. This rotary motion of the ratchet wheel causes the power-spring K to be wound up, and the spring being thus strained constantly tends to unwind, thereby turning the main spur wheel J and transmitting the motion of the latter to the crank shaft through the intermediate train of gearing at a greatly multiplied speed. The power-spring, through the medium of the multiple gearing, thus tends to urge the crank shaft forwardly and increase its speed, thereby aiding in propelling the machine and easing the labor of the rider. In order to obtain this action of the power-spring, the parts must be so highly geared that in running the machine at an ordinarily high speed upon a comparatively smooth road, the power-spring will be wound up by the seat vibrations more rapidly than it is allowed to unwind by the rotation of the crank shaft. The latter will thus constantly resist the unwinding of the spring and be urged forward with greater force the greater the resistance it offers to the unwinding of the spring. The spring, while being wound up intermittently by the ratchet device, unwinds with a continuous motion and transmits the power of the seat vibrations to the crank shaft with a steady and regular motion.

My improved motor is especially advantageous in ascending heavy grades or in riding on rough roads, as in such cases the vibrations of the seat are greater and more numerous and the power-spring is, therefore, more highly strained and assists in a correspondingly increased measure in propelling the machine.

When the machine is ridden at an unusually high speed upon a smooth road, such as asphalt pavement for instance, the seat-vibrations are apt to be insufficient to wind the power-spring faster than it is allowed to unwind by the rotation of the crank shaft. If this should be the case, the ratchet or clutch mechanism of the crank shaft, before described, permits the crank shaft to rotate forward freely without being restrained by the motor.

In the drawings, my improved motor is shown in connection with a bicycle having a diamond-shaped frame, but it may be applied to other machines by adapting the form of the supporting frame of the motor to the requirements of the velocipede frame.

While I have shown and described my improvement as applied to a velocipede having a crank shaft, I do not wish to be confined to such use, because the device could be adapted to velocipedes of different construction without departing from the spirit of my invention. It is also obvious that the construction and arrangement of the multiple gearing could be altered by employing a greater or less number of gear wheels, the special arrangement of the gearing herein shown and described not being essential but simply adapted to the style of machine shown in the drawings.

I claim as my invention—

1. The combination with an axle or journal of a velocipede or other vehicle and a stationary supporting frame mounted on the vehicle, of a ratchet or winding wheel and a gear wheel both journaled in said frame, a power spring connecting said gear wheel with said winding wheel, an actuating device engaging with said winding wheel and connected with a vibrating part of the vehicle, and intermediate gearing whereby said axle or journal is rotated from said gear wheel, substantially as set forth.

2. The combination with the axle or journal of a velocipede or other vehicle and a stationary supporting frame mounted on the vehicle, of a ratchet or winding wheel and a gear wheel, both journaled in said supporting frame, a power spring connecting said gear wheel with said winding wheel, an actuating device for turning said winding wheel connected with a vibrating part of the vehicle, a gear wheel mounted loosely on said axle and receiving motion from the gear wheel connected with the power spring, and a clutch device applied to said loose gear wheel, which compels the axle to turn with its gear wheel when the axle rotates slower than the gear wheel, and allows the axle to rotate without restraint when turning faster than its gear wheel, substantially as set forth.

3. The combination with a velocipede having a seat capable of vibrating vertically and a crank shaft, of a supporting frame attached to the velocipede, a ratchet wheel and a gear wheel mounted in said supporting frame, a spiral spring connecting said gear wheel and ratchet wheel, a vibrating arm carrying an actuating pawl engaging with said ratchet wheel, a rod connecting said arm with the seat, and intermediate gearing whereby the motion of said gear wheel is transmitted to the crank shaft, substantially as set forth.

4. The combination with a velocipede having a seat capable of vibrating vertically and a crank shaft, of a supporting frame attached to the velocipede, a ratchet wheel and a gear wheel journaled in said frame and having notched or recessed hubs, a spiral spring surrounding said shaft and having its ends seated in the notches of said wheel-hubs, a vibrating actuating pawl engaging with said ratchet wheel and operated from the seat of of the velocipede, and intermediate gearing whereby the motion of said gear wheel is transmitted to the crank shaft, substantially as set forth.

5. A motor for utilizing the power of the seat-vibrations of velocipedes, consisting of a supporting frame, a ratchet wheel mounted in said frame, a gear wheel also mounted in said frame and adapted to be geared with the driving shaft of the velocipede, a spiral spring secured at one end to said ratchet wheel and at its opposite end to said gear wheel, a vibrating arm adapted to be connected with the seat of the velocipede and carrying an actuating pawl engaging with said ratchet wheel, and a detent which prevents retrograde movement of the ratchet wheel, substantially as set forth.

Witness my hand this 25th day of May, 1892.

JOHN G. STAMP.

Witnesses:
 FRED. C. GEYER,
 THEO. L. POPP.